United States Patent
Abdelhameed et al.

(10) Patent No.: US 12,253,969 B2
(45) Date of Patent: Mar. 18, 2025

(54) VALIDATION OF A TIME SYNCHRONIZATION

(71) Applicant: Bayerische Motoren Werke Aktiengesellschaft, Munich (DE)

(72) Inventors: Mohamed-Saad Abdelhameed, Dachau (DE); Manjeet Singh Bilra, Hoerlkofen (DE); Karl Budweiser, Munich (DE); Wolfgang Laengst, Bergkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 18/031,187

(22) PCT Filed: Oct. 12, 2020

(86) PCT No.: PCT/EP2020/078637
§ 371 (c)(1),
(2) Date: Apr. 11, 2023

(87) PCT Pub. No.: WO2022/078571
PCT Pub. Date: Apr. 21, 2022

(65) Prior Publication Data
US 2023/0376446 A1   Nov. 23, 2023

(51) Int. Cl.
*G06F 13/42* (2006.01)
*H04J 3/06* (2006.01)
*H04J 3/14* (2006.01)

(52) U.S. Cl.
CPC ........ *G06F 13/4295* (2013.01); *H04J 3/0661* (2013.01); *H04J 3/14* (2013.01)

(58) Field of Classification Search
CPC ........ G06F 13/4295; H04J 3/0661; H04J 3/14
See application file for complete search history.

(56) References Cited

U.S. PATENT DOCUMENTS

| 10,671,558 | B1* | 6/2020 | Evans ................. G06F 13/405 |
| 2005/0015521 | A1 | 1/2005 | Hartwich |

(Continued)

FOREIGN PATENT DOCUMENTS

| DE | 101 45 219 A1 | 4/2003 |
| EP | 3 156 904 A1 | 4/2017 |

(Continued)

OTHER PUBLICATIONS

International Search Report (PCT/ISA/210) issued in PCT Application No. PCT/EP2020/078637 dated Jul. 23, 2021 (three (3) pages).

(Continued)

*Primary Examiner* — Henry Tsai
*Assistant Examiner* — Aurangzeb Hassan
(74) *Attorney, Agent, or Firm* — Crowell & Moring LLP

(57) ABSTRACT

A method includes sending, from the master controller to the slave controller, a follow up message in response to a pull of a predefined pin, wherein the follow up message includes a global time of the master controller when the predefined pin was pulled; sending, from the slave controller to the master controller, a validation message in response to the received follow up message, wherein the validation message includes a global time of the slave controller when the pull of the predefined pin is detected by the slave controller; and validating the time synchronization by checking, at the master controller and/or the slave controller, if a difference between the global time of the master controller when the predefined pin was pulled and the global time of the slave controller when the pull of the predefined pin is detected by the slave controller is smaller than a predefined first threshold.

16 Claims, 2 Drawing Sheets

(56) References Cited

U.S. PATENT DOCUMENTS

| | | | |
|---|---|---|---|
| 2015/0074306 A1* | 3/2015 | Ayyagari | G06F 13/4072 |
| | | | 710/110 |
| 2016/0087738 A1* | 3/2016 | Jeon | H04J 3/0667 |
| | | | 370/350 |
| 2016/0124459 A1* | 5/2016 | Armbruster | G06F 1/10 |
| | | | 709/248 |
| 2018/0196465 A1* | 7/2018 | Sharpe-Geisler | H04J 3/0661 |
| 2018/0219694 A1* | 8/2018 | Kim | H04L 12/40163 |
| 2019/0332137 A1 | 10/2019 | Benjamini et al. | |
| 2019/0363815 A1 | 11/2019 | Bogenberger et al. | |
| 2023/0155806 A1* | 5/2023 | Abdelhameed | H04L 12/40 |
| | | | 370/503 |

FOREIGN PATENT DOCUMENTS

| | | |
|---|---|---|
| JP | 2020-526051 A | 8/2020 |
| WO | WO 2019/001929 A1 | 1/2019 |
| WO | WO 2019/018798 A1 | 1/2019 |

OTHER PUBLICATIONS

Written Opinion (PCT/ISA/237) issued in PCT Application No. PCT/EP2020/078637 dated Jul. 23, 2021 (eight (8) pages).

Raju, S. et al, "Time Synchronized Diagnostic Event Data Recording based on AUTOSAR", 2017 IEEE International Conference on Advanced Networks and Telecommunications Systems (ANTS), IEEE, Dec. 17, 2017, pp. 1-6, XP033358556 (six (6) pages).

Beltrami, M. et al., "Multiprocessor System for Developing Control Strategies of Car Engines", $29^{th}$ IEEE Vehicular Technology Conference, Mar. 27, 1979, pp. 396-403, XP001425352 (10 pages).

"(R) Taxonomy and Definitions for Terms Related to Driving Automation Systems for On-Road Motor Vehicles", Surface Vehicle Recommended Practice, SAE (Society of Automotive Engineering) International, J3016$^{tm}$, Sep. 2016, pp. 1-30 (30 pages).

English translation of Japanese-language Office Action issued in Japanese Application No. 2023-515640 dated Oct. 23, 2024 (3 pages).

* cited by examiner

VALIDATION OF A TIME SYNCHRONIZATION

BACKGROUND AND SUMMARY OF THE INVENTION

The present invention is directed to a method for validation of a time synchronization of at least two controllers connected to each other via a private bus, a master controller configured to be connected to a slave controller via a private bus and to carry out the method at least partly, a slave controller configured to be connected to a master controller via a private bus and to carry out the method at least partly, a communication network comprising the master and the slave controller, and a vehicle, e.g. a car, comprising the communication network.

With an increasing complexity of autonomous or automated vehicles, multiple communication busses are used by different electronic control units (ECUs) to ensure that autonomous or automated driving functions fulfill safety requirements, e.g. requirements needed to fulfill a so called Automotive Safety Integrity Level (ASIL).

The Automotive Safety Integrity Level is a risk classification scheme defined by ISO 26262—Functional Safety for Road Vehicles. The ASIL classification comprises five safety levels, starting from QM with the lowest safety requirements to ASIL D having the highest safety requirements.

All related controllers which take part in critical decision making of automated driving functions need to have a synchronized time according to the other controllers. Time synchronization for highly automated vehicles, e.g. a car of a SAE Level 3 or Level 4 or higher (wherein the SAE J3016 standard describes classification and definition of terms for road-bound vehicles with automated driving systems), need to fulfill ASIL D.

In the state of the art, time synchronization of an Ethernet bus is done according to IEEE 802.1AS for a TSN (time sensitive network) and IEEE 1588 with respect to the PTP (Precision Time Protocol). However, for time synchronization via PTP there are several measures that can be taken in addition to the respective standards, so that the integrity of the synchronization process and thus the integrity of the distributed time-base can be ensured.

However, if the controllers are connected to each other by a private bus system (e.g. PCI Express, CAN-FD, MIPI, SERDES, SPI etc.) PTP implementation for time synchronization is not available.

In the light of this state of the art, the object of the present invention is to provide a solution for validation of a time synchronization of at least two controllers connected to each other via a private bus, wherein it is ensured that a predefined safety integrity level is fulfilled, e.g. ASIL B or higher.

The object is solved by the features of the claimed invention.

More specifically, the object is solved by a method for validation of a time synchronization of at least two controllers connected to each other via a private bus, wherein one of the at least two controllers is a master controller and the other one of the at least two controllers is a slave controller.

The method comprises a plurality of cycles. Each cycle includes sending, from the master controller to the slave controller, a follow up message in response to a pull of a predefined pin of the master controller, wherein the follow up message includes a global time of the master controller when the predefined pin was pulled.

Each cycle further includes sending, from the slave controller to the master controller, a validation message in response to the received follow up message, wherein the validation message includes a global time of the slave controller when the pull of the predefined pin is detected by the slave controller.

Each cycle (except the initial/first cycle) further includes validating the time synchronization by checking, at the master controller and/or the slave controller, if a difference between the global time of the master controller when the predefined pin was pulled and the global time of the slave controller when the pull of the predefined pin is detected by the slave controller is smaller than a predefined first threshold. A pre-condition for doing this can be that the synchronized global time at the master controller is already validated.

The method can include capturing, at the master controller, a global time of the master controller when the predefined pin was pulled.

The validation message can include a local hardware counter of the slave controller, wherein the local hardware counter corresponds to the global time of the slave controller when the pull of the predefined pin is detected by the slave controller.

The local hardware counter of the slave controller is a second source of time enabling the master and/or the slave controller to perform the following check.

That is, validating the time synchronization can further include checking, at the master controller, if a difference between a difference of the global time captured by the master controller when the predefined pin was pulled and a global time captured by the master controller when the predefined pin was pulled in a previous cycle, and a difference between the local hardware counter corresponding to the global time of the slave controller when the pull of the predefined pin is detected by the slave controller and a local hardware counter corresponding to a global time of the slave controller when the pull of the predefined pin is detected by the slave controller in the previous cycle is smaller than a predefined second threshold. This validation is not performed in the initial/first cycle of the method.

Additionally or alternatively, validating the time synchronization can include checking, at the slave controller, if a difference between a difference of the global time of the master controller received by the slave controller in the follow up message and a global time of the master controller received by the slave controller in the follow up message in a previous cycle, and a difference between the local hardware counter corresponding to the global time of the slave controller when the pull of the predefined pin is detected by the slave controller and the local hardware counter corresponding to the global time of the slave controller when the pull of the predefined pin is detected by the slave controller in the previous cycle is smaller than the predefined second threshold.

The validation message can include the difference between the local hardware counter corresponding to the global time of the slave controller when the pull of the predefined pin is detected by the slave controller and the local hardware counter corresponding to a global time of the slave controller when the pull of the predefined pin is detected by the slave controller in the previous cycle. That is, the validation message can already include the difference between the hardware counters, wherein the difference is computed by the slave controller.

The master controller can be connected to a further bus. The further bus can also be called main bus.

The master controller can comprise a master port and a slave port, wherein the master controller is connected via its slave port to the further bus. The slave port and the master port can each comprise their own clock.

The method can comprise synchronizing a global time of the clock of the slave port of the master controller with a global time of the further bus and synchronizing a global time of the clock of the master port of the master controller to the global time of the clock of the slave port of the master controller, preferably after synchronizing the global time of the clock of the slave port to the global time of the further bus.

The method can further comprise capturing, at the master controller, a global time of the slave port when the predefined pin was pulled. Also this is preferably done after synchronizing the global time of the clock of the slave port to the global time of the further bus.

Due the above, the master controller can perform the following check. That is, validating the time synchronization can include checking, at the master controller, if a difference between the global time captured by the master controller at the master port, i.e. the global time of the clock of the master port of the master controller, when the predefined pin was pulled and the global time captured by the master controller at the slave port, i.e. the global time of the clock of the slave port of the master controller, when the predefined pin was pulled is smaller than a predefined third threshold.

The method can comprise, preferably after capturing the local hardware counter and the global time of the slave controller when the pull of the predefined pin is detected by the slave controller, updating a global time of the slave controller to the global time of the master controller included in the follow up message.

The validation message can include the global time sent from the master controller to the slave controller in the follow up message. Thus it is possible that validating the time synchronization includes checking, at the master controller, if a difference between the global time captured by the master controller when the predefined pin was pulled and the global time included in the validation message is smaller than a predefined forth threshold.

Furthermore, a master controller is provided, wherein the master controller is configured to be connected to a slave controller via a private bus.

The master controller is further configured to send a follow up message to the slave controller via the private bus in response to a pull of a predefined pin of the master controller and recording, i.e. capturing, the time when the pin was pulled, wherein the follow up message includes a global time of the master controller when the predefined pin was pulled.

The master controller is further configured to receive a validation message from the slave controller via the private bus in response to the sent follow up message, wherein the validation message includes a global time of the slave controller when the pull of the predefined pin is detected by the slave controller.

The master controller is further configured to validate a time synchronization of a global time of the slave controller to a global time of the master controller by checking if a difference between the global time of the master controller when the predefined pin was pulled and the global time of the slave controller when the pull of the predefined pin is detected by the slave controller is smaller than a predefined first threshold.

The validation message can include a local hardware counter of the slave controller as a second source of time, wherein the local hardware counter corresponds to the global time of the slave controller when the pull of the predefined pin is detected by the slave controller.

The master controller can be configured to capture a global time of the master controller when the predefined pin was pulled, i.e. the master controller can comprise at least one clock and the time of this clock is captured by the master controller when the predefined pin was pulled.

The master controller can be configured to validate the time synchronization of the global time of the slave controller to the global time of the master controller by checking if a difference between the global time captured by the master controller when the predefined pin was pulled and a global time captured by the master controller when the predefined pin was pulled in a previous cycle, and a difference between the local hardware counter corresponding to the global time of the slave controller when the pull of the predefined pin is detected by the slave controller and a local hardware counter corresponding to a global time of the slave controller when the pull of the predefined pin is detected by the slave controller in the previous cycle is smaller than a predefined second threshold.

The validation message can include the difference between the local hardware counter corresponding to the global time of the slave controller when the pull of the predefined pin is detected by the slave controller and the local hardware counter corresponding to a global time of the slave controller when the pull of the predefined pin is detected by the slave controller in the previous cycle.

The master controller can be configured to be connected to a further bus and synchronize its global time to a global time of the further bus.

More specifically, the master controller can comprise a master port and a slave port, wherein the slave port and the master port each comprise a clock. The master controller can be connected to the further bus, e.g. a main bus of a vehicle, via its slave port, and be configured to synchronize a global time of the clock of the slave port to a global time of the further bus. This can be done by using PTP. Preferably afterwards, the master controller synchronizes a global time of the clock of the master port to the global time of the clock of the slave port of the master controller and captures a global time of the slave port when the predefined pin was pulled.

The master controller can be configured to validate a time synchronization of the global time of the clock of its slave port and the global time of the clock of its master port by checking if a difference between the global time of the clock of its master port, preferably captured when the predefined pin was pulled, and the global time of the clock of its slave port, also preferably captured when the predefined pin was pulled, is smaller than a predefined third threshold.

This validation enables the master controller to check if a difference between its internal clocks is in an acceptable range.

Furthermore, a slave controller is provided, wherein the slave controller is configured to be connected to a master controller via a private bus.

The slave controller is further configured to receive a follow up message from the master controller via the private bus in response to a pull of a predefined pin of the master controller, wherein the follow up message includes a global time of the master controller when the predefined pin was pulled.

The slave controller is further configured to detect the pull of the predefined pin of the master controller and capture a global time of the slave controller when the pull of the predefined pin is detected by the slave controller.

The slave controller is further configured to validate the time synchronization by checking if a difference between the global time of the master controller included in the follow up message and the global time captured by the slave controller when the pull of the predefined pin is detected by the slave controller, i.e. the global time of a clock of the slave controller at the time of detecting the pull of the predefined pin at the slave controller, is smaller than a predefined first threshold.

The slave controller can be configured to send a validation message to the master controller via the private bus in response to the received follow up message.

The validation message can include the global time of the slave controller when the pull of the predefined pin is detected by the slave controller such that the master controller can validate the time synchronization by checking, at the master controller, if a difference between the global time of the master controller when the predefined pin was pulled and the global time of the slave controller when the pull of the predefined pin is detected by the slave controller is smaller than the predefined first threshold. It is possible that the validation message also includes the global time of the master controller included in the follow up message.

The slave controller can be configured to capture a local hardware counter of the slave controller, wherein the local hardware counter corresponds to the global time of the slave controller when the pull of the predefined pin is detected by the slave controller.

The slave controller can be configured to validate the time synchronization of the global time of the slave controller and the global time of the master controller by checking if a difference between a difference of the global time of the master controller included in the follow up message and a global time of the master controller included in the follow up message in a previous cycle, and a difference between the local hardware counter corresponding to the global time of the slave controller when the pull of the predefined pin is detected by the slave controller and a local hardware counter corresponding to a global time of the slave controller when the pull of the predefined pin is detected by the slave controller in the previous cycle is smaller than a predefined second threshold.

The slave controller can be configured to send the validation message including the local hardware counter of the slave controller and the global time of the master controller included in the follow up message such that the master controller can validate the time synchronization of the global time of the slave controller and the global time of the master controller by checking if the difference between the difference of the global time of the master controller included in the validation message and a global time of the master controller included in the validation message in a previous cycle, and a difference between the local hardware counter corresponding to the global time of the slave controller when the pull of the predefined pin is detected by the slave controller and a local hardware counter corresponding to a global time of the slave controller when the pull of the predefined pin is detected by the slave controller in the previous cycle is smaller than the predefined second threshold. Both local hardware counters can be included in the validation message. It is also possible that solely the difference between the two local hardware counters is included in the validation message.

The slave controller can be configured to update a global time of the slave controller to the global time of the master controller included in the follow up message when the pull of the predefined pin is detected by the slave controller but after capturing the local hardware counter and the global time of the slave controller.

Furthermore, a communication network is provided, wherein the communication network can comprise the above described master controller, the above described slave controller, and a private communication bus connecting the master controller and the slave controller to each other. The private communication bus can comprise a connection between the predefined pin of the master controller and the slave controller.

The communication network can comprise a further communication bus connected to the master controller, wherein the master controller is configured to synchronize its global time to a global time of the further bus.

Furthermore a vehicle, e.g. a car, can be provided, wherein the vehicle comprises the above described communication network.

In short, the basic principle of the invention is to emulate the PTP for the time synchronization of the controllers.

The time synchronization validation according to ASIL B or ASIL D can be ensured by virtue of different safety mechanisms. The controllers, e.g. microcontrollers, can be divided into a master controller with one or more slave controllers, where the master controller is connected to any communication bus (e.g. Ethernet, Flexray, CAN-FD) which allows standard time synchronization. Solely the master controller is connected to the further bus, i.e. the main bus, and therefore the master and the slave controller are part of a private network, i.e. a self-contained network.

The master controller can have only one time representation or can have a time synchronization slave port and multiple time synchronization master ports.

The master controller provides a follow up message with its global time when the predefined pin is pulled from the master controller, e.g. a general purpose input/output pin (GPIO). The slave controller can only have a time synchronization slave port.

A combined usage of the pin pulling or emulated pin pulling together with the time synchronization mechanism with a follow up message can be provided.

As close as possible to the point in time when the pull of the predefined pin at the master controller is detected on the slave controller side, the value of the local hardware counter as well as its associated global time can be captured.

The global time at the slave controller shall be captured before the global time on the slave controller is updated based on the new value received by the follow up message, i.e. the follow-up message sent from the master to the slave controller in response to the pull of the predefined pin.

After the capture of the hardware counter and the global time at the slave controller, the time synchronization mechanism can update the global time on the slave controller using the follow up message.

It is possible to use the local hardware counters with the time synchronization mechanism, i.e. the GPIO pull and the follow up message, to validate the system time on the slave controller side.

This concept enables different controllers which may be connected to each other by a communication channel to internally validate their time, wherein a standard synchronization and validation mechanism is not available.

For the time validation, no additional pin, e.g. GPIO, connection between the master and the slave controller is needed because the one pin connection for time synchronization which is commonly used can be shared between time synchronization and time validation at the master and the slave controller, respectively.

In the time between any two synchronizations a validation message, i.e. the validation message in response to the received follow up message, can be sent from the slave controller to the master controller.

This validation message can include the difference of the hardware counters of the slave controller in between two points of synchronization, the captured global time of the slave controller when the pull of the predefined pin was registered in the current communication cycle as well as the global time which was received inside the follow up message.

The master controller can capture the global time which is written into the follow up message very close to the point in time when the predefined pin was pulled.

The safety/validation checks can be performed on the master and the slave controller to include a leap detection on both sides.

On the slave side, the difference of the global time captured at the slave controller at the point in time when the predefined pin was pulled and the global time which was received at the follow up message should be smaller than the predefined first threshold.

On the Master side, the difference of a global time which is written into the follow up message and the received global time on the slave side which is included in the validation message should be smaller than the predefined first threshold.

In the following, a description of an embodiment of the present invention is given with respect to FIGS. 1 and 2.

DETAILED DESCRIPTION OF THE DRAWINGS

Figure 1:
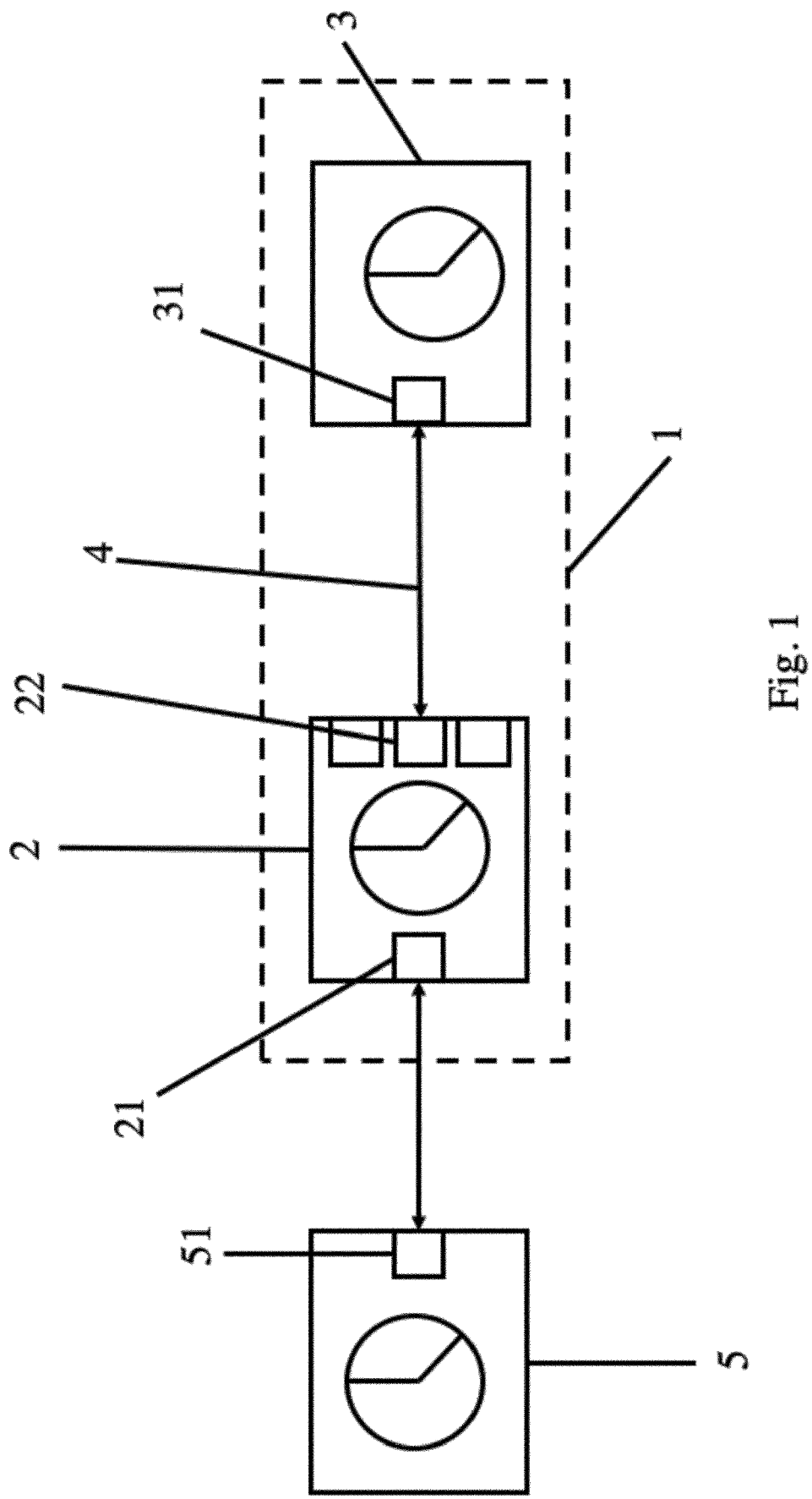
FIG. 1 depicts schematically a communication network to be used in a method for validation of a time synchronization of at least two controllers connected to each other via a private bus.

As can be gathered from FIG. 1, the communication network 1 comprises a master controller 2, a slave controller 3, and a private communication bus 4 connecting the master controller 2 and the slave controller 3 to each other.

The master controller 2 comprises a slave port 21 connected to a master port 51 of a master controller 5 of another, i.e. a further, communication network. The master controller 2 further comprises a master port 22 connected to a slave port 31 of the slave controller 3 via the private communication bus 4, wherein these ports 22, 31 are used for the time synchronization of the master and the slave controller 2, 3 described in detail in the following with respect to FIG. 2.

The further communication network, i.e. the further communication bus (e.g. Ethernet, Flexray, CAN-FD), allows standard time synchronization, such that the global time of the master controller 2 is synchronized to the global time of the further communication bus, e.g. by receiving a time synchronization message including a synchronized time $t_{aS1}$ from the master port 51 of the master controller 5 of the further communication network via the slave port 21 at the master controller 2.

More specifically, the master port 22 and the slave port 21 each comprise their own clock. The global time of the clock of the slave port 21 is synchronized to a global time of the further bus, e.g. by using PTP, and afterwards a global time of the clock of the master port 22 is synchronized to the synchronized global time of the clock of the slave port 21.

Figure 2:
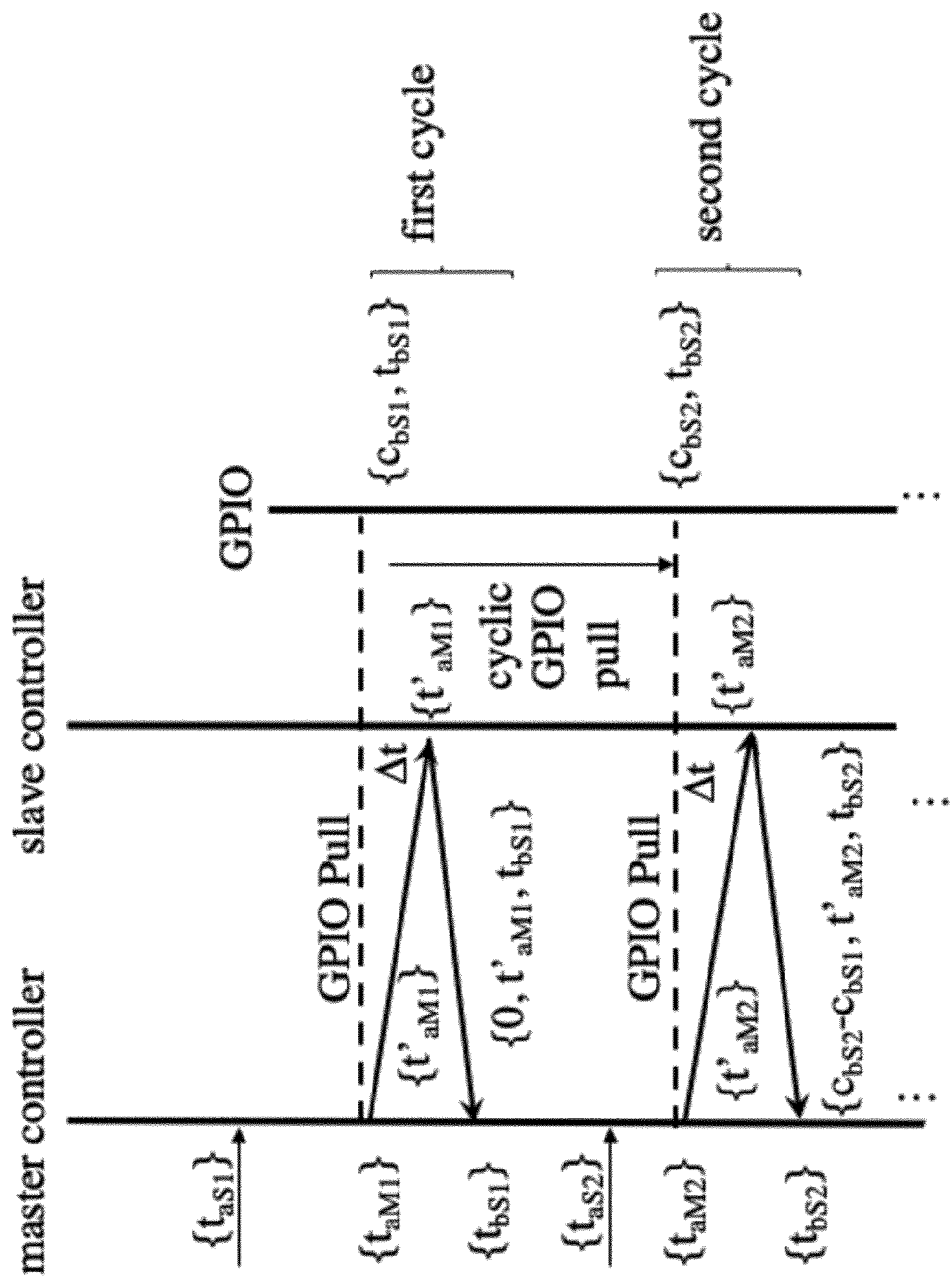
FIG. 2 depicts schematically a flowchart of the method for validation of the time synchronization of the at least two controllers connected to each other via the private bus.

The method comprising a plurality of cycles, wherein two cycles are shown in FIG. 2. A start of each cycle is triggered by a pull of a predefined pin of the master controller 2, here a cyclic GPIO pull.

At first, i.e. after synchronizing the global time of the master controller 2 to the global time of the further bus, the master controller 2 sends a follow up message in response to the pull of the predefined pin of the master controller 2 via the private communication bus 4 to the slave port 31 of the slave controller 3.

The follow up message includes a global time $t_{aM1}$, $t_{aM2}$ of the master controller 2 when, i.e. at which, the predefined pin was pulled during the actual cycle of the method.

In response to the follow up message received at the slave controller 3, the slave controller 3 sends a validation message to the master controller 2 via its slave port 31 and the communication bus 4.

The validation message includes a global time $t_{bS1}$, $t_{bS2}$ of the slave controller 3 when the pull of the predefined pin is detected by the slave controller 3 in the actual/current cycle. The master controller 3 is configured to capture, i.e. save, the received global time $t_{bS1}$, $t_{bS2}$. The validation message further includes a local hardware counter $c_{bS1}$, $c_{bS2}$ of the slave controller 3, wherein the local hardware counter $c_{bS1}$, $c_{bS2}$ corresponds to the global time $t_{bS1}$, $t_{bS2}$ of the slave controller 3 when the pull of the predefined pin is detected by the slave controller 3 in the current cycle.

Therefore, the slave controller 3 captures the global time $t_{bS1}$, $t_{bS2}$ of the slave controller 3 together with the local hardware counter $c_{bS1}$, $c_{bS2}$ when the pull of the predefined pin is detected by the slave controller 3. As can be gathered from FIG. 2, each value of the hardware counter $c_{bS1}$, $c_{bS2}$ is directly linked to the global time $t_{bS1}$, $t_{bS2}$, i.e. the synchronized time, of the slave controller 3 of the respective cycle.

The slave controller 3 calculates a difference between the local hardware counter $c_{bS2}$ corresponding to the global time $t_{bS2}$ of the slave controller 3 when the pull of the predefined pin is detected by the slave controller 3 in the current cycle and the local hardware counter $c_{bS1}$ corresponding to the global time $t_{bS1}$ of the slave controller when the pull of the predefined pin is detected by the slave controller 3 in the previous cycle. This difference is send from the slave controller 3 to the master controller 2 in the validation message. The values $t_{bS1}$, $c_{bS1}$ were captured in the previous synchronization cycle. Since it is not possible to calculate this difference in first cycle of the method (due to the missing local hardware counter corresponding to the global time of the slave controller when the pull of the predefined pin is detected by the slave controller 3 in the previous cycle) this value is set to zero during the first cycle, i.e. in the first validation message.

After capturing these values $t_{bS1}$, $c_{bS1}$, $t_{bS2}$, $c_{bS2}$, the slave controller 3 updates, i.e. synchronizes, its global time to the global time $t'_{aM1}$, $t'_{aM2}$ received from the master controller 2 in the follow up message.

Furthermore, the slave controller 3 adds the global time $t'_{aM1}$, $t'_{aM2}$ to the validation message received from the master controller 2 in the follow up message and which is the time to which the global time of the slave controller 3 was updated. Sending the received global time $t'_{aM1}$, $t'_{aM2}$ from the follow up message back to the master controller 2 makes sure that the value was not falsified on the communication path, e.g at a sending communication stack of the master controller 2, during the transmission on the private bus 4, at a receiving communication stack of the slave controller 3, at a sending communication stack of the slave controller 3 and/or at a receiving communication stack of the master controller 2.

Since the software processing in the slave controller 3 takes some time, wherein this delay is indicated by Δt in FIG. 2, also other uncertainties are present in program and hardware handling, and the time synchronization of the master controller 2 and the slave controller 3 is handled with standard mechanisms which fulfill only ASIL QM safety requirements, it must be validated, i.e. it must be ensured, that the difference in the global time of the master controller 2 and the slave controller 3 is in a certain range. This could be done with safety requirements up to ASIL D.

Validating the time synchronization comprises checking, at the master controller 2 and the slave controller 3, if a difference between the global time $t'_{aM2}$ of the master controller 2 when the predefined pin was pulled during the second cycle and the global time $t_{bS2}$ of the slave controller when the pull of the predefined pin is detected by the slave controller 3 during the second cycle is smaller than a predefined first threshold. Therefore, the master controller 2 receives the global time $t'_{aM2}$, which is included in the follow up message, as well as the global time $t_{bS2}$ of the slave controller 3 in the validation message sent from the slave controller 3 to the master controller 2. In other words, the slave controller 3 sends back the global time $t'_{aM2}$ to the master controller 2 in the validation message.

This check is performed to ensure that the global time of the master controller 2 and the global time of the slave controller 3 are synchronized such that they fulfill the above described safety integrity requirements, e.g. ASIL D.

Alternatively or additionally, the master controller 2 does not only send the global time $t'_{aM2}$ of the master controller 2 when the predefined pin was pulled but also captures and saves the global time $t_{aM2}$ of the master controller 2 when the predefined pin was pulled.

Validating the time synchronization then also includes checking, at the master controller 2, if a difference between a difference of the global time $t_{aM2}$ captured by the master controller 2 during the second cycle and the global time $t_{aM1}$ captured by the master controller 2 when the predefined pin was pulled during the first cycle, and a difference between the local hardware counter $c_{bS2}$ received by the master controller 2 during the second cycle and the local hardware counter $c_{bS1}$ also received by the master controller 2 during the second cycle and corresponding to the global time $t_{bS1}$ of the slave controller 3 when the pull of the predefined pin was detected by the slave controller 3 during the first cycle is smaller than a predefined second threshold.

Thereby it is possible to check if a time elapsed between the first and the second cycle on the slave controller 3 using the counter value, i.e. the difference between the local hardware counters $c_{bS2}-c_{bS1}$, and a time elapsed between the first and the second cycle on the master controller 2 using the time difference of the master port 31, i.e. $t_{aM2}-t_{aM1}$, is synchronized, i.e. within the acceptable range (see above, e.g. ASIL D).

Validating the time synchronization can also include checking, at the slave controller 3, if a difference between a difference of the global time $t'_{aM2}$ received by the slave controller 3 during the second cycle and the global time $t'_{aM1}$ received by the slave controller 3 during the first cycle, and a difference between the local hardware counter $c_{bS2}$ captured by the slave controller 3 during the second cycle and the local hardware counter $c_{bS1}$ captured by the slave controller 3 during the first cycle and corresponding to the global time $t_{bS1}$ of the slave controller 3 when the pull of the predefined pin is detected by the slave controller 3 during the first cycle is smaller than the predefined second threshold.

Thereby it is possible to check if a time elapsed between the first and the second cycle on the slave controller 3 using the counter value, i.e. the difference between the local hardware counters $c_{bS2}-c_{bS1}$, and a time elapsed between the first and the second cycle on the master controller 2 using the time difference of the global time included in the follow up message, i.e. $t'_{aM2}-t'_{aM1}$, is synchronized, i.e. within the acceptable range (see above, e.g. ASIL D).

It is also possible to check if the time synchronization of the master port 22 and the slave port 21 of the master controller 2 are synchronized, i.e. are within the acceptable range (see above, e.g. ASIL D). Therefore, validating the time synchronization can include checking, at the master controller 2, if a difference between the global time $t_{aM2}$ captured by the master controller 2 at the master port 22 when the predefined pin was pulled during the second cycle and the global time $t_{aS2}$ captured by the master controller 2 at the slave port 21 when the predefined pin was pulled during the second cycle is smaller than a predefined third threshold. This check can also be performed starting from the first cycle of the method ($t_{aM1}-t_{aS1}$<third threshold).

Furthermore, to ensure the integrity of the communication path of the private bus 4 the captured time $t_{aM2}$ at master controller 2 (when the predefined pin was pulled and written to the follow up message to the slave controller 3) is compared by the master controller 2 to the global time $t'_{aM2}$ (which the slave controller 3 received in the follow up message and wrote into the validation message to the master controller 2), wherein the difference between these values should be smaller than a predefined forth threshold. $t_{aM2}$ and $t'_{aM2}$ might be different due to the fact that a sending path of the master controller 3, a transmission path and a reception path of the slave controller 3 are only realized as ASIL QM using standard Autosar mechanism. This check can also be performed starting from the first cycle of the method ($t'_{aM1}-t_{aM1}$<forth threshold).

The above described checks can be summarized for the master controller 2 as follows:

$t_{bS2}-t'_{aM2}$<first threshold $t_{aM2}-t_{aM1}-(c_{bS2}-c_{bS1})$<second threshold $t_{aM2}-t_{aS2}$<third threshold $t'_{aM2}-t_{aM2}$<forth threshold The above described checks can be summarized for the slave controller 3 as follows:

$t_{bS2}-t'_{aM2}$<first threshold $t'_{aM2}-t'_{aM1}-(c_{bS2}-c_{bS1})$<second threshold

REFERENCE SIGNS LIST 1 communication network
2 master controller
21 slave port of master controller
22 master port of master controller
3 slave controller
31 slave port of slave controller 4 private communication bus
5 further master controller of further communication network
51 master port of further master controller
GPIO general purpose input/output
$t_{aM1}$, $t_{aM2}$ global time of a clock of the master port of the master controller when the predefined pin was pulled during first/second cycle
$t'_{aM1}$, $t'_{aM2}$ global time of the master port of the master controller when the predefined pin was pulled during first/second cycle which is received by the slave controller
$t_{aS1}$, $t_{aS2}$ global time of the slave port of the master controller
$c_{bS1}$, $c_{bS2}$ local hardware counter corresponding to the global time of the slave controller when the pull of the predefined pin is detected by the slave controller in the first/second cycle
$t_{bS1}$, $t_{bS2}$ global time of the slave controller when the pull of the predefined pin is detected by the slave controller in the first/second cycle

The invention claimed is:

1. A method for validation of a time synchronization of at least two controllers connected to each other via a private communication bus, wherein one of the at least two controllers is a master controller and the other one of the at least two controllers is a slave controller, the method comprising:
a plurality of cycles, wherein each cycle comprises:
sending, from the master controller to the slave controller, a follow up message in response to a pull of a predefined pin of the master controller, wherein the follow up message includes a global time of the master controller when the predefined pin was pulled,
sending, from the slave controller to the master controller, a validation message in response to the received follow up message, wherein the validation message includes a global time of the slave controller when the pull of the predefined pin is detected by the slave controller, and
validating the time synchronization by checking, at the master controller and/or the slave controller, if a difference between the global time of the master controller when the predefined pin was pulled and the global time of the slave controller when the pull of the predefined pin is detected by the slave controller is smaller than a predefined first threshold.

2. The method according to claim 1, further comprising:
capturing, at the master controller, a global time of the master controller when the predefined pin was pulled,
wherein the validation message includes a local hardware counter of the slave controller, the local hardware counter corresponding to the global time of the slave controller when the pull of the predefined pin is detected by the slave controller, and
wherein the validating the time synchronization includes checking, at the master controller, if a difference between
a difference of the global time captured by the master controller when the predefined pin was pulled and a global time captured by the master controller when the predefined pin was pulled in a previous cycle, and
a difference between the local hardware counter corresponding to the global time of the slave controller when the pull of the predefined pin is detected by the slave controller and a local hardware counter corresponding to a global time of the slave controller when the pull of the predefined pin is detected by the slave controller in the previous cycle,
is smaller than a predefined second threshold, and/or
wherein the validating the time synchronization includes checking, at the slave controller, if a difference between
a difference of the global time of the master controller received by the slave controller in the follow up message and a global time of the master controller received by the slave controller in the follow up message in a previous cycle, and
a difference between the local hardware counter corresponding to the global time of the slave controller when the pull of the predefined pin is detected by the slave controller and the local hardware counter corresponding to the global time of the slave controller when the pull of the predefined pin is detected by the slave controller in the previous cycle,
is smaller than the predefined second threshold.

3. The method according to claim 2, wherein the validation message includes the difference between the local hardware counter corresponding to the global time of the slave controller when the pull of the predefined pin is detected by the slave controller and the local hardware counter corresponding to a global time of the slave controller when the pull of the predefined pin is detected by the slave controller in the previous cycle.

4. The method according to claim 2, wherein the master controller comprises a master port and a slave port, wherein the master controller is connected via the slave port to a further bus and the slave port and the master port each comprise a clock, and
wherein the method further comprises:
synchronizing a global time of the clock of the slave port of the master controller with a global time of the further bus,
synchronizing a global time of the clock of the master port of the master controller to the global time of the clock of the slave port of the master controller, and
capturing, at the master controller, a global time of the slave port when the predefined pin was pulled,
wherein the validating the time synchronization includes checking, at the master controller, if a difference between the global time captured by the master controller at the master port when the predefined pin was pulled and the global time captured by the master controller at the slave port when the predefined pin was pulled is smaller than a predefined third threshold.

5. The method according to claim 2, further comprising:
updating a global time of the slave controller to the global time of the master controller included in the follow up message after capturing the local hardware counter and the global time of the slave controller when the pull of the predefined pin is detected by the slave controller.

6. The method according to claim 2,
wherein the validation message includes the global time sent from the master controller to the slave controller in the follow up message, and
wherein the validating the time synchronization includes checking, at the master controller, if a difference between the global time captured by the master controller when the predefined pin was pulled and the global time included in the validation message is smaller than a predefined fourth threshold.

7. A master controller configured to be connected to a slave controller via a private bus, the master controller comprising:
a processor, wherein the master controller is further configured to:
send a follow up message to the slave controller via the private bus in response to a pull of a predefined pin of the master controller, wherein the follow up message includes a global time of the master controller when the predefined pin was pulled,
receive a validation message from the slave controller via the private bus in response to the sent follow up message, wherein the validation message includes a global time of the slave controller when the pull of the predefined pin is detected by the slave controller, and
validate a time synchronization of a global time of the slave controller and a global time of the master controller by checking if a difference between the global time of the master controller when the predefined pin was pulled and the global time of the slave controller when the pull of the predefined pin is detected by the slave controller is smaller than a predefined first threshold.

8. The master controller according to claim 7,
wherein the validation message includes a local hardware counter of the slave controller, the local hardware counter corresponding to the global time of the slave controller when the pull of the predefined pin is detected by the slave controller,
wherein the master controller is configured to capture a global time of the master controller when the predefined pin was pulled, and
wherein the master controller is further configured to validate the time synchronization of the global time of the slave controller and the global time of the master controller by checking if a difference between
a difference of the global time captured by the master controller when the predefined pin was pulled and a global time captured by the master controller when the predefined pin was pulled in a previous cycle, and
a difference between the local hardware counter corresponding to the global time of the slave controller when the pull of the predefined pin is detected by the slave controller and a local hardware counter corresponding to a global time of the slave controller when the pull of the predefined pin is detected by the slave controller in the previous cycle,
is smaller than a predefined second threshold.

9. The master controller according to claim 8, wherein the validation message includes the difference between the local hardware counter corresponding to the global time of the slave controller when the pull of the predefined pin is detected by the slave controller and the local hardware counter corresponding to the global time of the slave controller when the pull of the predefined pin is detected by the slave controller in the previous cycle.

10. The master controller according to claim 7, wherein the master controller further comprises a master port and a slave port, the slave port and the master port each comprising a clock,
wherein the master controller is connected via the slave port to a further bus, and
wherein the master controller is further configured to:
synchronize a global time of the clock of the slave port to a global time of the further bus,
synchronize a global time of the clock of the master port to the global time of the clock of the slave port of the master controller,
capture a global time of the slave port when the predefined pin was pulled, and
validate a time synchronization of the global time of the master controller by checking if a difference between the global time of the master port when the predefined pin was pulled and the global time of the slave port when the predefined pin was pulled is smaller than a predefined third threshold.

11. A slave controller configured to be connected to a master controller via a private bus, the slave controller comprising:
a processor, wherein the slave controller is further configured to:
receive a follow up message from the master controller via the private bus in response to a pull of a predefined pin of the master controller, wherein the follow up message includes a global time of the master controller when the predefined pin was pulled,
detect the pull of the predefined pin of the master controller and capture a global time of the slave controller when the pull of the predefined pin is detected by the slave controller, and
validate a time synchronization by checking if a difference between the global time of the master controller included in the follow up message and the global time captured by the slave controller when the pull of the predefined pin is detected by the slave controller is smaller than a predefined first threshold.

12. The slave controller according to claim 11, wherein the slave controller is further configured to send a validation message to the master controller via the private bus in response to the received follow up message,
wherein the validation message includes the global time of the slave controller when the pull of the predefined pin is detected by the slave controller such that the master controller can validate the time synchronization by checking, at the master controller, if a difference between the global time of the master controller when the predefined pin was pulled and the global time of the slave controller when the pull of the predefined pin is detected by the slave controller is smaller than the predefined first threshold.

13. The slave controller according to claim 11, wherein the slave controller is further configured to:
capture a local hardware counter of the slave controller, the local hardware counter corresponding to the global time of the slave controller when the pull of the predefined pin is detected by the slave controller, and
validate the time synchronization of the global time of the slave controller and the global time of the master controller by checking if a difference between
a difference of the global time of the master controller included in the follow up message and a global time of the master controller included in the follow up message in a previous cycle, and
a difference between the local hardware counter corresponding to the global time of the slave controller when the pull of the predefined pin is detected by the slave controller and a local hardware counter corresponding to a global time of the slave controller when the pull of the predefined pin is detected by the slave controller in the previous cycle,
is smaller than a predefined second threshold.

14. The slave controller according to claim 13,
wherein the slave controller is configured to send the validation message including the local hardware counter of the slave controller and the global time of the master controller included in the follow up message such that the master controller can validate the time synchronization of the global time of the slave controller and the global time of the master controller by checking if the difference between the difference of the global time of the master controller included in the validation message and a global time of the master controller included in the validation message in the previous cycle, and the difference between the local hardware counter corresponding to the global time of the slave controller when the pull of the predefined pin is detected by the slave controller and the local hardware counter corresponding to the global time of the slave controller when the pull of the predefined pin is detected by the slave controller in the previous cycle, is smaller than the predefined second threshold.

15. The slave controller according to claim 11, wherein the slave controller is further configured to update a global time of the slave controller to the global time of the master controller included in the follow up message after capturing the local hardware counter and the global time of the slave controller.

16. A communication network comprising:
a master controller comprising a first processor,
a slave controller comprising a second processor, and
a private communication bus connecting the master controller and the slave controller to each other, wherein the private communication bus comprises a connection between a predefined pin of the master controller and the slave controller, wherein the master controller is configured to:
send a follow up message to the slave controller via the private bus in response to a pull of the predefined pin of the master controller, wherein the follow up message includes a global time of the master controller when the predefined pin was pulled, receive a validation message from the slave controller via the private bus in response to the sent follow up message, wherein the validation message includes a global time of the slave controller when the pull of the predefined pin is detected by the slave controller, and validate a time synchronization of a global time of the slave controller and a global time of the master controller by checking if a difference between the global time of the master controller when the predefined pin was pulled and the global time of the slave controller when the pull of the predefined pin is detected by the slave controller is smaller than a predefined first threshold, and wherein the slave controller is configured to:
receive the follow up message from the master controller via the private bus, detect the pull of the predefined pin of the master controller and capture the global time of the slave controller when the pull of the predefined pin is detected by the slave controller, and validate the time synchronization by checking if the difference between the global time of the master controller included in the follow up message and the global time captured by the slave controller when the pull of the predefined pin is detected by the slave controller is smaller than the predefined first threshold.

* * * * *